(12) United States Patent
Moon (10) Patent No.: US 11,098,659 B2
(45) Date of Patent: Aug. 24, 2021

(54) METHOD FOR CVVD STARTUP CONTROL USING DUAL DURATION AND A CVVD SYSTEM THEREOF

(71) Applicants: HYUNDAI MOTOR COMPANY, Seoul (KR); KIA MOTORS CORPORATION, Seoul (KR)

(72) Inventor: Chi-Ho Moon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 9 days.

(21) Appl. No.: 16/842,337

(22) Filed: Apr. 7, 2020

(65) Prior Publication Data

US 2021/0131356 A1 May 6, 2021

(30) Foreign Application Priority Data

Nov. 1, 2019 (KR) .......................... 10-2019-0138499

(51) Int. Cl.
| | |
|---|---|
| *F02N 11/08* | (2006.01) |
| *F02D 13/02* | (2006.01) |
| *F02D 41/00* | (2006.01) |
| *F02D 41/06* | (2006.01) |

(52) U.S. Cl.
CPC ..... *F02D 13/0215* (2013.01); *F02D 41/0002* (2013.01); *F02D 41/06* (2013.01); *F02D 41/062* (2013.01); *F02D 41/064* (2013.01); *F02D 41/068* (2013.01); *F02N 11/0829* (2013.01); *F02D 2013/0292* (2013.01); *F02D 2200/101* (2013.01); *F02D 2200/602* (2013.01)

(58) Field of Classification Search
CPC ............. F02D 13/0215; F02D 13/0234; F02D 13/0242; F02D 41/0002; F02D 41/06; F02D 41/062; F02D 41/064; F02D 41/068; F02D 2013/0292; F02D 2200/101; F02D 2200/602; F02D 2041/001; F02N 11/0829; F02N 11/0814; Y02T 10/12; F01L 13/0015
USPC .... 123/90.11, 90.15, 339.1, 680, 685, 179.3, 123/179.4, 179.16; 701/103, 110, 112, 701/113
See application file for complete search history.

(56) References Cited

U.S. PATENT DOCUMENTS

| | | | |
|---|---|---|---|
| 10,400,685 | B2 | 9/2019 | Won |
| 2019/0085775 | A1 | 3/2019 | Won |

FOREIGN PATENT DOCUMENTS

| | | |
|---|---|---|
| JP | 2002221053 A | 8/2002 |
| JP | 2013167223 A | 8/2013 |
| KR | 20190031685 A | 3/2019 |

*Primary Examiner* — Hai H Huynh
(74) *Attorney, Agent, or Firm* — Lempia Summerfield Katz LLC (57) ABSTRACT

A method for continuous variable valve duration (CVVD) startup control may include a duration time delay control to prevent an engine revolutions per minute (RPM) variation through applying of a delay time with respect to a startup duration in the case where the startup duration at an initial startup is switched to a driving region duration after the startup lapse by a CVVD controller.

18 Claims, 5 Drawing Sheets

METHOD FOR CVVD STARTUP CONTROL USING DUAL DURATION AND A CVVD SYSTEM THEREOF

CROSS-REFERENCE TO RELATED APPLICATION

This application claims priority to Korean Patent Application No. 10-2019-0138499, filed on Nov. 1, 2019, which is incorporated herein by reference in its entirety.

BACKGROUND OF THE DISCLOSURE

Field of the Disclosure

Embodiments of the present disclosure relate to continuously variable valve duration (CVVD) system startup control, and more particularly, to a CVVD system capable of maintaining startup stability even if fuel environments and driving conditions are changed through dual duration at engine startup and after the engine startup lapse.

Description of the Related Art

In general, a continuously variable valve duration (CVVD) system greatly contributes to the improvement of engine startability through an open/close control of an intake valve interlocking with a continuous variable valve lift (CVVL) that controls an exhaust valve lift.

In particular, the CVVD defines the location of an actuator through short-side and long-side durations. The CVVD uses revolutions per minute (RPM) of a cam that is calculated from pulses of a camshaft position sensor (CMP sensor) for a short-side return location. Thus, the startup location at the engine startup is secured through accuracy of the short-side return at engine stop.

As described above, the CVVD can safely maintain the engine startability by making the engine startup be performed at an accurate short-side location.

SUMMARY OF THE DISCLOSURE

However, continuously variable valve duration (CVVD) makes the engine startup stabilities differ from each other using duration control values. In order to satisfy requirements, such as revolutions per minute (RPM) stability, fuel economy, emission, and performance, on conditions after the engine startup lapse, the CVVD requires proper duration configurations.

Further, in the case of using a fuel of which the fuel characteristic is not good, the CVVD may further deteriorate the engine startup stability due to the duration characteristic.

Embodiments of the present disclosure overcome the above disadvantages and other disadvantages not described above. Embodiments of the present disclosure also provide a method for CVVD startup control using dual duration. The CVVD startup control method can improve startup stability after attempting an engine startup by performing a startup duration for the engine startup and then applying a driving region duration configuration logic. The CVVD startup control method can also provide prompt reactivity while maintaining the startup stability even if fuel environments and driving conditions are changed by applying tip-in as an application condition together with an idle stop and go (ISG) startup having a different delay time application time as compared with a normal startup, particularly with respect to the driving region duration having a different CVVD target value from that of the startup duration.

Other objects and advantages of the present disclosure can be understood by the following description and should become apparent with reference to the embodiments of the present disclosure. Also, it should become apparent to those of ordinary skill in the art to which the present disclosure pertains that the objects and advantages of the present disclosure can be realized by the means as claimed and combinations thereof.

In accordance with an embodiment of the present disclosure, a method for CVVD startup control is provided. The method includes a duration time delay control to prevent an engine RPM variation through applying a delay time with respect to a startup duration in the case where the startup duration at an initial startup is switched to a driving region duration after the startup lapse by a CVVD controller.

As one embodiment, the startup duration is performed by a startup duration control. The startup duration control is performed by identifying the startup of an engine, operating a CVVD system in the startup duration, and determining a startup completion of the engine.

As one embodiment, the engine startup is divided into a normal startup and an ISG startup. The startup duration is configured by a CVVD target value, and configured RPM indicating a startup state of the engine is applied to the determining of the startup completion.

As one embodiment, the duration time delay control is divided into a startup lapse control for determining an idle state before applying the delay time, a tip-in control for identifying an accelerator pedal press, and a startup mode discrimination control for identifying a normal startup by a driver and an ISG startup.

As one embodiment, the startup lapse control is performed by accumulating a startup lapse time by operating a startup duration timer, and by determining whether to continue the idle state so as to be switched to the tip-in control in the case of a non-idle state or to be switched to the start mode discrimination control in the case of the idle state.

As one embodiment, the determining of whether to continue the idle state is performed using an accelerator pedal scope (APS) detection value. The tip-in control is performed by a driving region duration control, and the driving region duration control configures the driving region duration as a CVVD target value in accordance with an engine RPM and an engine load.

As one embodiment, the startup mode discrimination control is performed by discriminating the normal startup and the ISG startup from each other, continuing the normal startup by maintaining the startup duration for the delay time in the case of the normal startup, and continuing the ISG startup by maintaining the startup duration for the delay time in the case of the ISG startup.

As one embodiment, the ISG startup delay time is configured in a shortcut ratio that is shorter than that of the normal startup delay time. The shortcut ratio is 0.4:1 to 0.5:1.

As one embodiment, the driving region duration is performed by the driving region duration control. The driving region duration control configures the driving region duration as a CVVD target value in accordance with an engine RPM and an engine load.

In accordance with another embodiment of the present disclosure, a CVVD system includes a CVVD controller and an actuator mounted on an engine. The CVVD controller is configured: to apply a duration time delay control before a CVVD target value of a driving region duration is applied after a startup lapse after a CVVD target value of a startup duration is applied at an initial engine startup; and to prevent an engine RPM variation in accordance with switching between the startup duration and the driving region duration through a delay time for a normal startup by a driver and an ISG startup in an idle state where there is not tip-in due to the duration time delay control. The actuator is configured to control an operating mechanism through the startup duration and the driving region duration.

As one embodiment, the CVVD controller is provided with a CVVD dual map. The CVVD dual map is provided with a startup duration map to match the CVVD target value of the startup duration and a driving region duration map to match the CVVD target value of the driving region duration.

As one embodiment, the CVVD controller divides an engine startup into the normal startup by the driver and the ISG startup and divides the delay time into a normal startup delay time applied to the normal startup and an ISG startup delay time applied to the ISG startup.

As one embodiment, the normal startup delay time is configured to be longer than the ISG startup delay time so that the normal startup delay time and the ISG startup delay time have different values.

The CVVD startup control according to the present disclosure implements the following operations and effects through the dual duration to match the durations at the engine startup and after the engine startup lapse.

First, the perceived quality is maintained through maintaining the startup stability in the engine adopting the CVVD system. The engine response ability is secured through the instant response to the driver's demand after the startup. Second, the CVVD duration target value can be applied through the startup duration in order to secure the startup stability during the engine startup. Third, the engine RPM can be stabilized through the startup duration until the driving region duration is applied as the startup duration maintenance time configuration function. Fourth, in the case where the engine is not in an idle state through determination of whether the engine is in the idle state, it is possible to promptly react on the driver's pressing of the accelerator pedal and applying the driving region duration even if the startup duration maintenance time does not arrive. Fifth, the startup mode can be divided into the normal startup mode and the ISG startup mode by dividing the startup duration maintenance time into the normal startup mode maintenance time and the ISG startup mode maintenance time. Sixth, the startup stability can be greatly maintained in the engine adopting the continuous variable valve timing (CVVT) including the CVVD and the continuous variable valve lift (CVVL).

It is to be understood that both the foregoing general description and the following detailed description of the present disclosure are examples and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 5 is a diagram illustrating an example in which dual duration of a CVVD system according to the present disclosure is extended to idle stop and go (ISG) and tip-in.

DESCRIPTION OF SPECIFIC EMBODIMENTS

Hereinafter, an embodiment of the present disclosure is described in detail with reference to the accompanying drawings. However, since such an embodiment is an example and can be implemented in various different ways by those of ordinary skill in the art to which the present disclosure pertains, the present disclosure is not limited to the embodiment described hereinafter.

Figure 1:
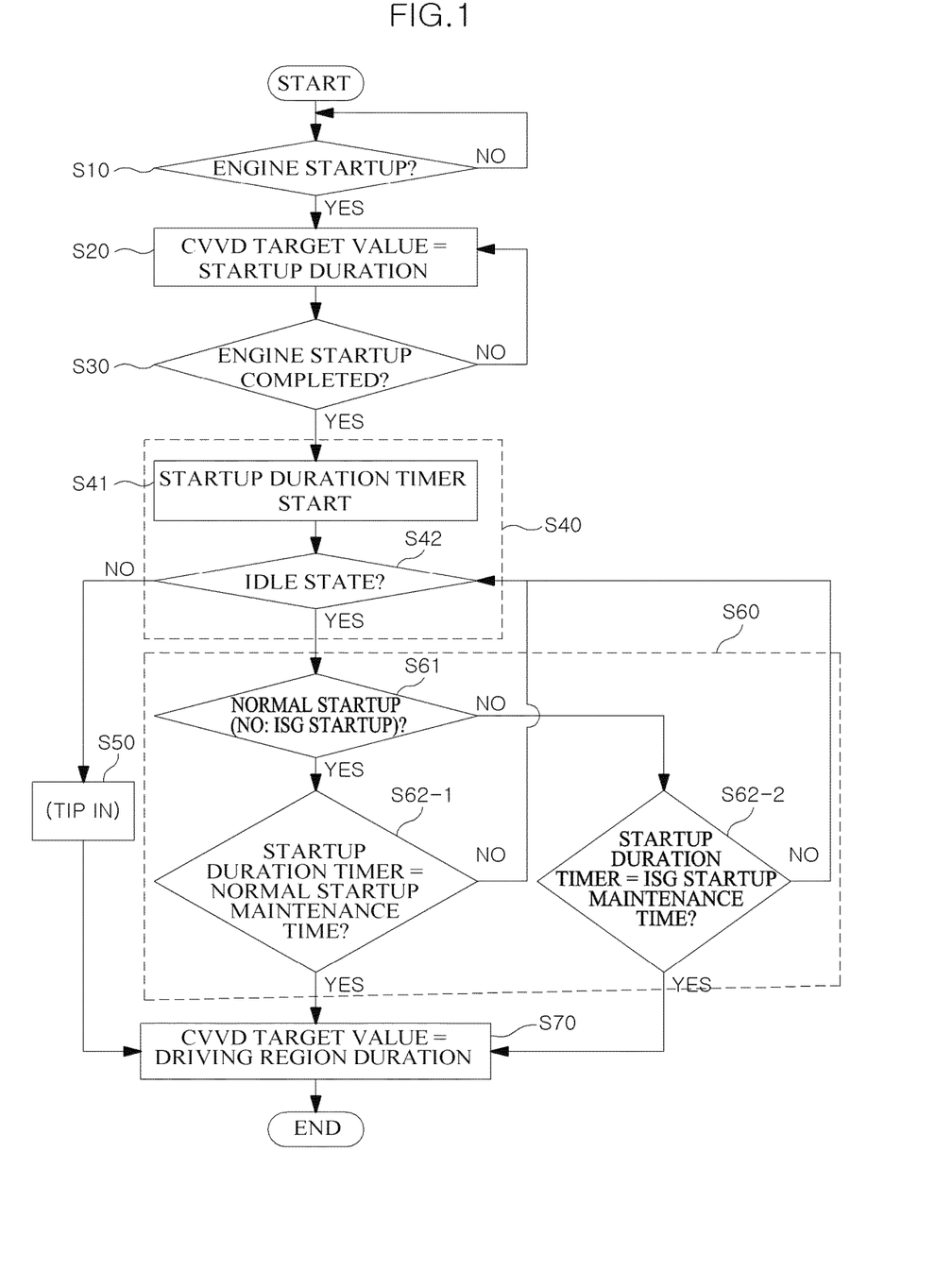
FIG. 1 is a flowchart illustrating a method for continuous variable valve duration (CVVD) startup control using dual duration according to the present disclosure.

Referring to FIG. 1, a method for continuous variable valve duration (CVVD) startup control is featured. The method for CVVD startup control uses dual duration, which can improve startup stability at initial startup and after the startup lapse through duration time delay control (S40 to S60) between a startup duration control (S20) and a driving region duration control (S70).

Figure 2:
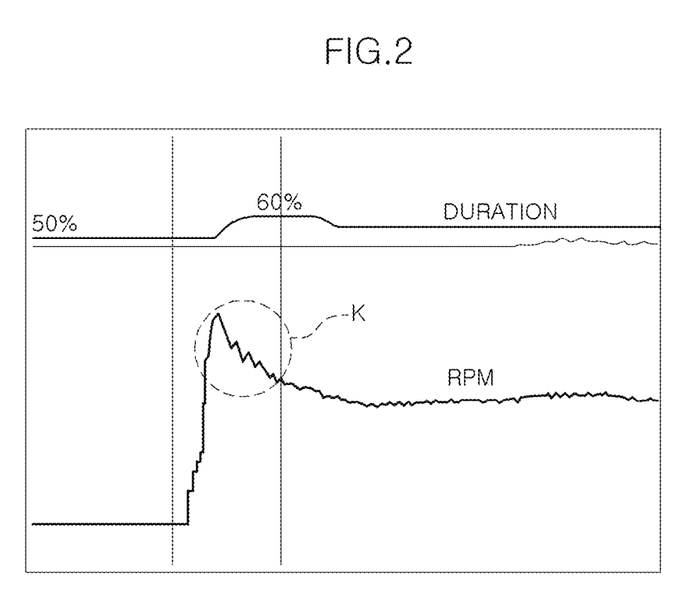
FIG. 2 is a diagram illustrating an example of engine revolutions per minute (RPM) variation that is resolved by dual duration according to the present disclosure.

In this example, the duration time delay control (S40 to S60) contributes to the resolving of engine revolutions per minute (RPM) variation K during the startup as exemplified in FIG. 2.

Referring to FIG. 2, the startup stability difference appearing in accordance with the duration during the startup of an engine to which the CVVD system is applied causes an engine RPM variation K to occur, even if the duration having good startup stability is applied.

Such an engine RPM variation K is caused by an engine behavior when a startup duration is switched to an engine driving region duration immediately after the startup. In this case, the engine driving region duration is switched to 60% in a state where the startup duration is 50%, and the engine RPM is varied at the initial switchover to 60%.

The method for CVVD startup control using dual duration improves the startup stability by applying a target duration in accordance with the engine driving region after a predetermined time elapses with a driving region duration configuration logic after performing the engine startup with a startup duration configuration logic. Accordingly, the method for CVVD startup control using dual duration manages the engine RPM variation caused by the duration, as shown in FIG. 2 through the dual duration.

As a result, the method for CVVD startup control using dual duration can maintain the perceived quality through maintaining the startup stability in the engine adopting the CVVD system. The method for CVVD startup control using dual duration can also secure the engine response ability through the instant response to the driver's demand after the startup.

Hereinafter, the method for CVVD startup control using dual duration is described in detail with reference to FIGS. 3-5. In this case, the control subject is a CVVD controller 5. Controlled subjects are a CVVD system 1 and an actuator 2.

First, the CVVD controller 5 determines whether the engine starts by a driver at engine startup identification operation (S10). In this case, the engine startup includes a normal startup and an idle stop and go (ISG) startup.

Figure 3:
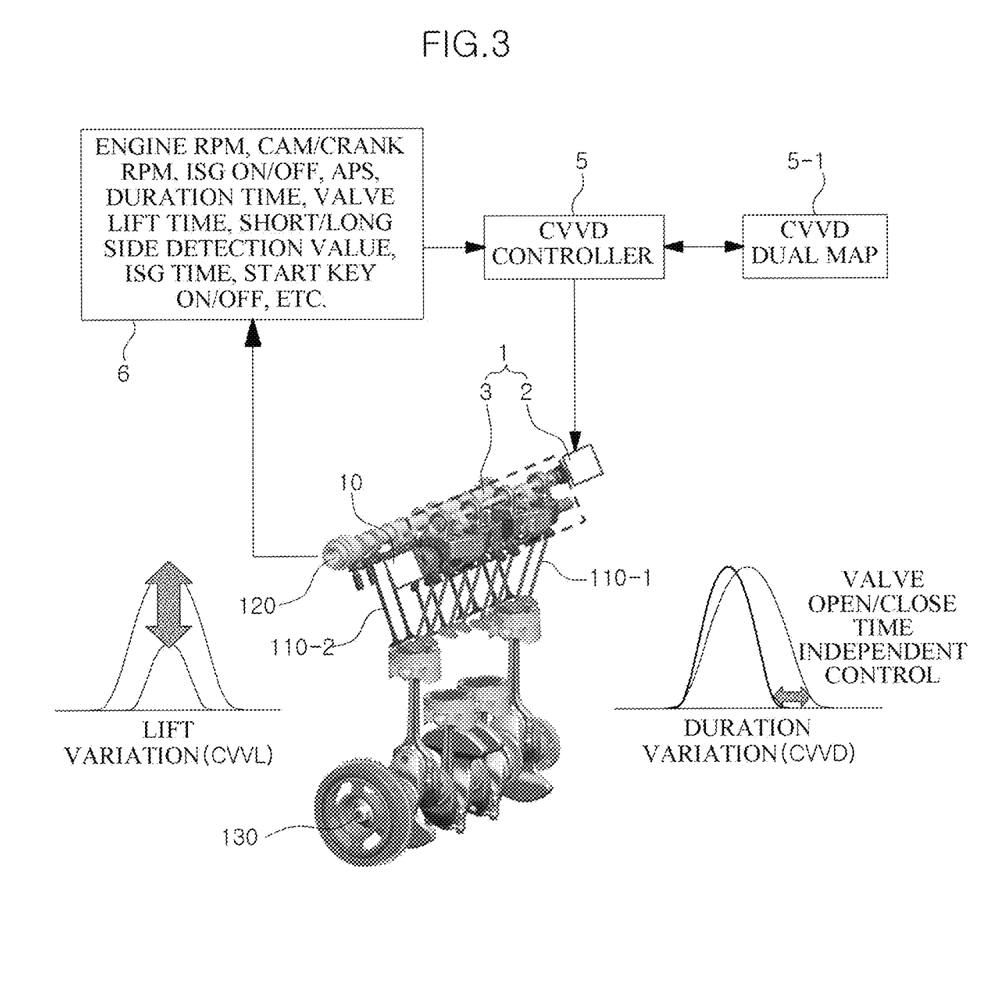
FIG. 3 is a diagram illustrating an example of a CVVD system that controls the startup through dual duration according to the present disclosure.

Referring to FIG. 3, the CVVD system 1 that is controlled by the CVVD controller 5 is mounted on an engine 100 together with a continuous variable valve lift (CVVL) system 10. The CVVD system 1 is associated with an intake valve 110-1 and an exhaust valve 110-2 by a cam shaft 120 that interlocks with a crank shaft 130. In this case, the duration of the CVVD system 1 is varied by the actuator 2 being controlled by the CVVD controller 5 and an operating mechanism 3 coupled to the cam shaft 120 without changing a valve lift for an independent control of an independent valve open/close time and optimum valve open/close time configuration. The CVVL system 10 makes the valve lift change simultaneously with the valve duration variation.

Further, the CVVD controller 5 performs engine startup by a startup duration configuration logic. After a predetermined time elapses, the CVVD controller 5 applies a target duration in accordance with an engine driving region by a driving region duration configuration logic. For this purpose, the CVVD controller 5 is provided with a memory for logic storage.

The CVVD controller 5 is associated with a CVVD dual map 5-1 and a data input unit 6. The CVVD dual map 5-1 is provided with a startup duration map and a driving region duration map. The CVVD dual map 5-1 provides the result of matching with input data of the data input unit 6 to the CVVD controller 5. During an operation of the engine 100, the data input unit 6 detects engine RPM, cam/crank RPM, ISG on/off, accelerator pedal scope (APS), duration time, valve lift time, short/long side detection value, ISG time, and start key on/off as the input data. The data input unit 6 provides the detected data to the CVVD controller 5.

Accordingly, among the input data of the data input unit 6, such as the engine RPM, cam/crank RPM, ISG on/off, accelerator pedal scope (APS), duration time, valve lift time, short/long side detection value, ISG time, and start key on/off, the CVVD controller 5 discriminates a normal startup and an ISG startup through the start key on/off signal and the ISG on/off signal, respectively. Through this, the CVVD controller 5 performs engine startup identification (S10).

After performing startup duration control (S20), the CVVD controller 5 then enters into duration time delay control (S40 to S60) if the engine startup is identified (S30).

Referring to FIG. 3, the CVVD controller 5 identifies the duration time and short/long side detection values corresponding to the input data of the data input unit 6. The CVVD controller 5 performs the startup duration control (S20) by operating the CVVD system 1 through the CVVD target duration against the startup duration.

Further, the CVVD controller 5 compares the engine RPM that is the input data of the data input unit 6 with a preset, reference, or configured RPM. If the engine RPM is detected to have increased to the configured RPM (e.g., 500 RPM) or more, the CVVD controller 5 determines that the engine startup is completed.

Thereafter, the CVVD controller 5 performs the duration time delay control (S40 to S60) that is divided into the startup lapse control (S40), tip-in control (S50), and startup mode discrimination control (S60).

As an example, the startup lapse control (S40) is divided into a startup duration timer operation (S41) and an engine idle state determination (S42) to be performed.

Referring to FIG. 3, the CVVD controller 5 identifies the duration time and the APS detection value corresponding to the input data of the data input unit 6.

Accordingly, the startup duration timer operation (S41) means a count start of a timer for monitoring a startup duration maintenance time after the startup completion. The engine idle state determination (S42) determines the idle state depending on whether tip-in (i.e., an accelerator pedal press) by a driver occurs.

As a result, if the engine gets out of the idle state by the tip-in, in a timer count accumulated situation, the CVVD controller 5 switches to the tip-in control (S50). Alternatively, if the engine continues the idle state, the CVVD controller 5 enters into the startup mode discrimination control (S60).

As an example, the tip-in control (S50) switches the startup duration over to the engine driving region duration through immediate switchover to the driving region duration control (S70).

As an example, the startup mode discrimination control (S60) is performed by discriminating the startup state (S61) in a state where the startup duration is maintained as it is, continuing the normal startup (S62-1), and continuing the ISG startup (S62-2). In this case, the CVVD controller 5 may excludes the startup situation in which the current startup is the ISG startup by applying the normal startup in the startup state discrimination (S61).

Specifically, if the CVVD controller 5 identifies the normal startup through the startup state discrimination (S61), the controller enters into the normal startup continuation (S62-1). The controller 5 then switches to the driving region duration control (S70) after maintaining the normal startup with the CVVD duration target value applied as the startup duration for a predetermined time (i.e., continuing the operations (S42 and S61)). In contrast, if the CVVD controller 5 is unable to identify the normal startup through the startup state discrimination (S61), the controller enters into the ISG startup continuation (S62-2). The controller 5 then switches to the driving region duration control (S70) after maintaining the ISG startup with the CVVD duration target value applied as the startup duration for a predetermined time (i.e., continuing the operations (S42 and S61)).

In particular, the normal startup maintenance time by the startup duration timer of the normal startup continuation (S62-1) is configured to be longer than the ISG startup maintenance time by the startup duration timer of the ISG startup continuation (S62-2).

As an example, if the normal startup maintenance time is set to "1", the ISG startup maintenance time is set to about 0.4 to 0.5. If the normal startup maintenance time is actually about 1.8 seconds, the ISG startup maintenance time is applied as about 0.8 seconds. This is because the ISG startup reflects the possibility that a vehicle immediately starts by the driver's demand.

Finally, the CVVD controller 5 may switch from the normal startup continuation (S62-1) to the driving region duration control (S70) or may switch from the ISG startup continuation (S62-2) to the driving region duration control (S70).

As an example, if the normal startup maintenance time arrival is identified by the timer in the normal startup continuation (S62-1), the CVVD controller 5 may switch to the driving region duration control (S70), and the driving region duration control (S70) may switch the CVVD duration target value to the driving region duration to make the operation of the CVVD system 1 different from that during the startup. In this case, the driving region duration controls the startup duration in consideration of the engine RPM and low/middle/high engine load as main factors. This is processed by a program included in the CVVD system control logic.

Figure 4:
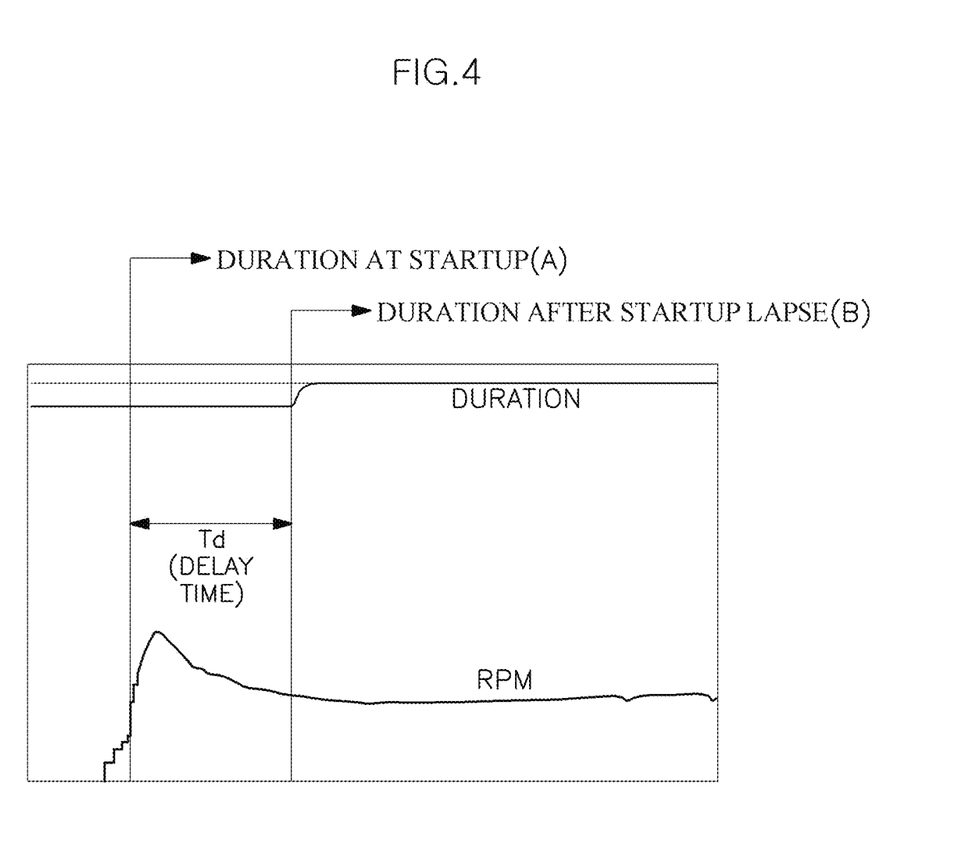
FIG. 4 is a diagram illustrating an example in which dual duration of a CVVD system according to the present disclosure is applied.

With reference to the normal startup maintenance time of FIG. 4, it is exemplified that the CVVD system 1 applies about 1.8 seconds between duration A at the startup and duration B after the startup lapse in consideration of the normal startup maintenance time as a delay time Td. Thus, the duration is controlled as the driving region duration after the RPM of the engine 100 is somewhat stabilized in a state where the startup duration at the initial startup is applied.

Through this, it is experimentally proven that the delay time Td at the normal startup resolves a bad influence exerted on the startup stability when the CVVD system 1 operates through an immediate switchover from the normal startup duration to the driving region duration without time delay. The delay time Td also resolves a bad influence that a fuel having the bad fuel characteristic and being used in some areas greatly exerts on the startup stability.

As a result, the delay time Td at the normal startup greatly softens the engine RPM behavior as compared with the startup duration continuation. The delay time Td does so by reducing ignition time variance and engine roughness variation with respect to the ignition time variance and the engine roughness variation, which are causes of the engine RPM variation K as exemplified in FIG. 2.

In contrast, the CVVD controller 5 switches to the driving region duration control (S70) if the ISG start maintenance time arrival is identified by the timer in the ISG startup continuation (S62-2). The driving region duration control (S70) switches the CVVD duration target value to the driving region duration to make the operation of the CVVD system 1 different from that at the startup. In this case, the driving region duration controls the startup duration in consideration of the engine RPM and the low/middle/high engine load as main factors. This is processed by a program included in the CVVD system control logic.

Figure 5:
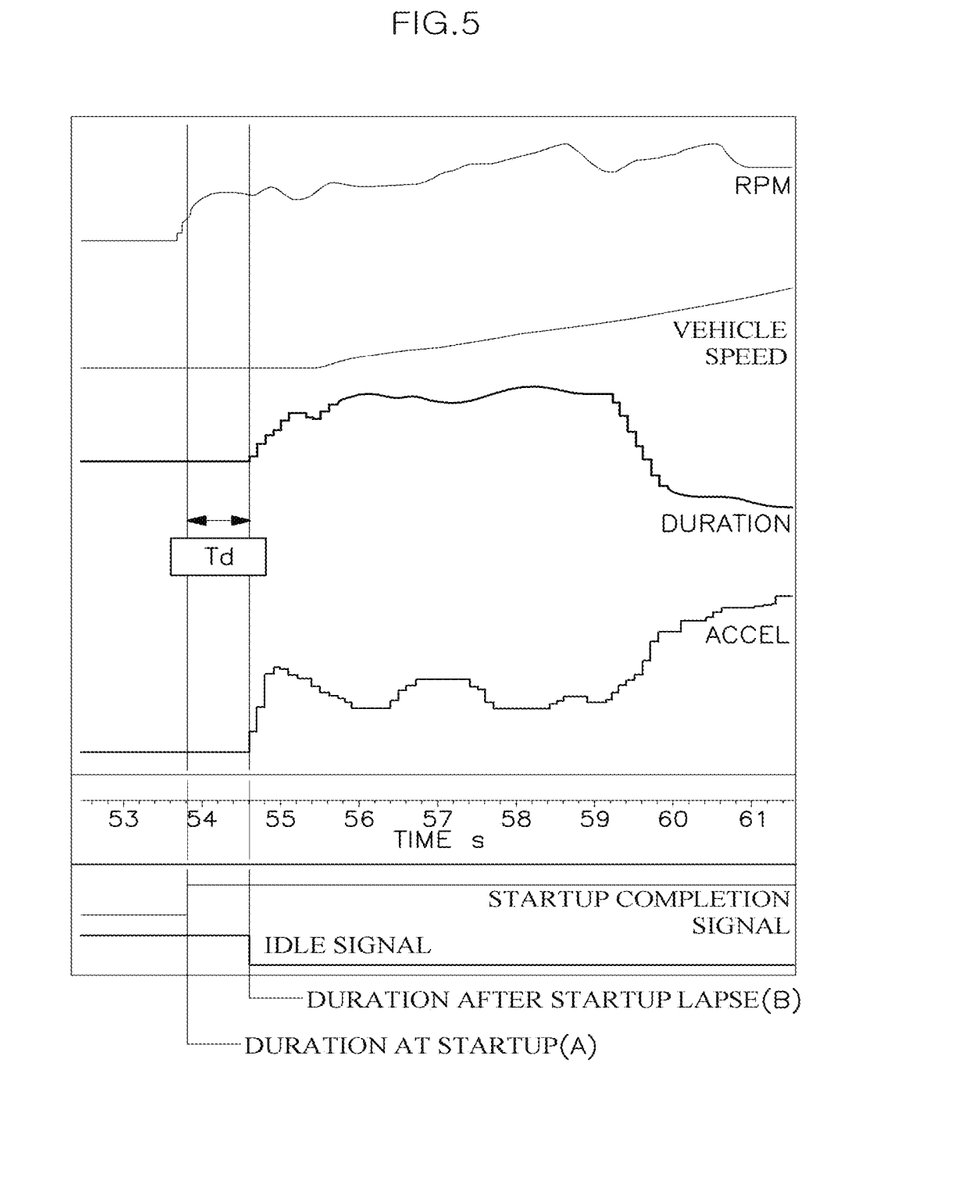

With reference to the ISG startup maintenance time of FIG. 5, the CVVD system 1 applies about 0.8 seconds between duration A at the startup and duration B after the startup lapse in consideration of the ISG startup maintenance time as a delay time Td. Thus, the duration is controlled as the driving region duration after the RPM of the engine 100 is somewhat stabilized in a state where the startup duration at the initial startup is applied.

Through this, it is experimentally proven that the delay time Td at the ISG startup resolves a bad influence exerted on the startup stability when the CVVD system 1 operates through an immediate switchover from the normal startup duration to the driving region duration without time delay. The delay time Td at the ISG startup also a bad influence that a fuel having the bad fuel characteristic and being used in some areas greatly exerts on the startup stability.

As a result, the delay time Td at the normal startup greatly softens the engine RPM behavior as compared with the startup duration continuation. The delay time Td does so by reducing ignition time variance and engine roughness variation with respect to the ignition time variance and the engine roughness variation, which are causes of the engine RPM variation K as exemplified in FIG. 2.

Further, the delay time Td at the ISG startup makes it possible to operate the engine to suit the demand of the driver that operates an accelerator pedal. The delay time at the ISG startup does so by enabling prompt driving region duration switchover to be performed immediately after the startup rather than the startup stability through applying the time lapse that is shorter than the delay time Td at the normal startup in consideration of the idle signal characteristic capable of determining whether the tip-in occurs.

As described above, according to the disclosed embodiment and method for CVVD startup control using dual duration is applied to the CVVD system 1. The duration time delay control is applied by the CVVD controller 5 before the CVVD target value of the driving region duration is applied after the startup lapse after the CVVD target value of the startup duration is applied at the initial engine startup. Then the engine RPM variation K in accordance with the switching between the startup duration and the driving region duration is prevented through the delay time Td for the normal startup by the driver and the ISG startup in the idle state where there is not the tip-in due to the duration time delay control. Accordingly, the startup stability after attempting the engine startup can be improved, and prompt reactivity or response ability can be provided with the startup stability maintained, even if the fuel environments and driving conditions are changed.

In an embodiment, the CVVD system 1, controller 5, or the like may include a microprocessor or other computer hardware device capable of being programmed with software, firmware or otherwise. The processor meets standard specifications for use and operation in vehicles.

The processor may be an application-specific integrated circuit ("ASIC"), digital signal processor, field programmable gate array ("FPGA"), digital circuit, analog circuit, general processor, or combinations thereof. In one example, the processor is one or more processors operable to control and/or communicate with the various electronics and logic of the associated components or devices.

The processor may run various determination programs including computer-executable instructions implemented in software or firmware. The processor may execute the program instructions to carry out the functions of the CVVD system 1, CVVD controller 5, and the like, as explained herein.

Further, when an element in the written description and claims is described as being "for" performing or carry out a stated function, step, set of instructions, or the like, the element may also be considered as being "configured to" do so.

While the present disclosure has been described with respect to the specific embodiments, it should be apparent to those of ordinary skill in the art that various changes and modifications may be made without departing from the spirit and scope of the disclosure as defined in the following claims.

What is claimed is:

1. A method for continuous variable valve duration (CVVD) startup control, the method comprising:
a duration time delay control to prevent an engine revolutions per minute (RPM) variation of an engine through applying a delay time with respect to a startup duration, wherein the startup duration at an initial startup is switched to a driving region duration after the startup lapse by a CVVD controller.

2. The method of claim 1, wherein the startup duration is performed by a startup duration control, and wherein the startup duration control is performed by identifying an engine startup of the engine, operating a CVVD system in the startup duration, and determining a startup completion of the engine.

3. The method of claim 2, wherein the engine startup is divided into a normal startup by a driver and an idle stop and go (ISG) startup.

4. The method of claim 2, wherein the startup duration is configured by a CVVD target value.

5. The method of claim 2, wherein in the determining of the startup completion, applying a configured revolutions per minute (RPM) indicating a startup state of the engine.

6. The method of claim 1, wherein the duration time delay control is divided into a startup lapse control for determining an idle state before applying the delay time, a tip-in control for identifying an accelerator pedal press, and a startup mode discrimination control for identifying a normal startup by a driver and an ISG startup.

7. The method of claim 6, wherein the startup lapse control is performed by accumulating a startup lapse time by operating a startup duration timer, and by determining whether to continue the idle state so as to be switched to the tip-in control in the case of a non-idle state or to be switched to the start mode discrimination control in the case of the idle state.

8. The method of claim 7, wherein the determining of whether to continue the idle state is performed using an accelerator pedal scope (APS) detection value.

9. The method of claim 7, wherein the tip-in control is performed by a driving region duration control, and wherein the driving region duration control configures the driving region duration as a CVVD target value in accordance with an engine RPM and an engine load.

10. The method of claim 7, wherein the startup mode discrimination control is performed by discriminating the normal startup and the ISG startup from each other, continuing the normal startup by maintaining the startup duration for the delay time in a case of the normal startup, and continuing the ISG startup by maintaining the startup duration for the delay time in a case of the ISG startup.

11. The method of claim 10, wherein the ISG startup delay time is configured in a shortcut ratio that is shorter than that of the normal startup delay time.

12. The method of claim 11, wherein the shortcut ratio is 0.4:1 to 0.5:1.

13. The method of claim 1, wherein the driving region duration is performed by the driving region duration control, and wherein the driving region duration control configures the driving region duration as a CVVD target value in accordance with an engine RPM and an engine load.

14. A continuous variable valve duration (CVVD) system comprising:
a CVVD controller configured to apply a duration time delay control before a CVVD target value of a driving region duration is applied after a startup lapse after a CVVD target value of a startup duration is applied at an initial engine startup, and to prevent an engine revolutions per minute (RPM) variation in accordance with switching between the startup duration and the driving region duration through a delay time for a normal startup by a driver and an idle stop and go (ISG) startup in an idle state where there is not tip-in due to the duration time delay control; and
an actuator mounted on an engine and configured to control an operating mechanism through the startup duration and the driving region duration.

15. The CVVD system of claim 14, wherein the CVVD controller is provided with a CVVD dual map, and wherein the CVVD dual map is provided with a startup duration map to match the CVVD target value of the startup duration and a driving region duration map to match the CVVD target value of the driving region duration.

16. The CVVD system of claim 14, wherein the CVVD controller divides an engine startup into the normal startup by the driver and the ISG startup and divides the delay time into a normal startup delay time applied to the normal startup and an ISG startup delay time applied to the ISG startup.

17. The CVVD system of claim 16, wherein the normal startup delay time and the ISG startup delay time are configured to be different from each other.

18. The CVVD system of claim 16, wherein the normal startup delay time is configured to be longer than the ISG startup delay time.

* * * * *